US011135796B2

(12) United States Patent
Farris et al.

(10) Patent No.: US 11,135,796 B2
(45) Date of Patent: Oct. 5, 2021

(54) METHODS FOR FORMING FOOTWEAR USING RECYCLED PLASTICS

(71) Applicant: NIKE, Inc., Beaverton, OR (US)

(72) Inventors: Bryan N. Farris, North Plains, OR (US); Noah Murphy-Reinhertz, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 124 days.

(21) Appl. No.: 16/425,299

(22) Filed: May 29, 2019

(65) Prior Publication Data

US 2019/0366590 A1    Dec. 5, 2019

Related U.S. Application Data

(60) Provisional application No. 62/678,472, filed on May 31, 2018.

(51) Int. Cl.
*A43B 1/00* (2006.01)
*B29D 35/00* (2010.01)
(Continued)

(52) U.S. Cl.
CPC .......... *B29D 35/122* (2013.01); *A43B 1/0027* (2013.01); *A43B 1/12* (2013.01); *A43B 13/04* (2013.01); *B29C 39/023* (2013.01); *B29C 45/1634* (2013.01); *B29C 45/1679* (2013.01); *B29C 70/64* (2013.01); *B29D 35/0009* (2013.01); *B29D 35/0054* (2013.01); *A43B 1/0063* (2013.01); *B29B 17/0042* (2013.01); *B29C 44/04* (2013.01); *B29C 2037/0039* (2013.01); *B29C 2045/1698* (2013.01);
(Continued)

(58) Field of Classification Search
CPC ............ B29C 45/1634; B29C 45/1679; B29C 2045/1698; B29C 70/64; B29C 2037/0039; B29C 39/023
See application file for complete search history.

(56) References Cited

U.S. PATENT DOCUMENTS 3,818,086 A    6/1974 Stastny et al.
4,480,054 A    10/1984 Enderle
(Continued)

FOREIGN PATENT DOCUMENTS

WO    2009042599 A1    4/2009

*Primary Examiner* — Benjamin A Schiffman
(74) *Attorney, Agent, or Firm* — Quinn IP Law

(57) ABSTRACT

Presented are manufacturing systems, methods, and devices for forming footwear using scrap or waste plastic materials. A method for manufacturing an article of footwear, such as an athletic shoe, begins with receiving a batch of recycled plastic, which may include thermoplastic elastomers or ethylene-vinyl acetate, and grinding the batch of recycled plastic material. The ground recycled material is processed, for example, by adding a foaming agent that activates at elevated temperatures. The processed recycled material is placed into the internal cavity of a final mold that is shaped like a segment of the footwear, such as a unitary sole structure. To form the footwear segment, the processed recycled material is heated past the threshold activation temperature of the foaming agent such that the foaming agent causes the recycled material to expand and fill the internal cavity of the final mold. The formed footwear segment is then extracted from the mold.

25 Claims, 4 Drawing Sheets

(51) Int. Cl.
  *B29D 35/12*    (2010.01)
  *A43B 13/04*    (2006.01)
  *A43B 1/12*     (2006.01)
  *B29C 45/16*    (2006.01)
  *B29C 39/02*    (2006.01)
  *B29C 70/64*    (2006.01)
  *B29B 17/00*    (2006.01)
  *B29C 44/04*    (2006.01)
  *C08J 9/10*     (2006.01)
  *C08J 11/06*    (2006.01)
  *B29C 37/00*    (2006.01)

(52) U.S. Cl.
  CPC ............... *C08J 9/103* (2013.01); *C08J 11/06* (2013.01); *C08J 2300/30* (2013.01); *Y02P 20/143* (2015.11); *Y02P 70/62* (2015.11)

(56) References Cited

U.S. PATENT DOCUMENTS

| | | |
|---|---|---|
| 5,246,976 A | 9/1993 | Pontiff |
| 5,786,403 A | 7/1998 | Okada et al. |
| 9,074,061 B2 * | 7/2015 | Yu .............................. C08J 9/35 |
| 9,610,746 B2 * | 4/2017 | Wardlaw ............ B29D 35/0054 |
| 2007/0149630 A1 | 6/2007 | Yamamoto et al. |
| 2008/0269363 A1 | 10/2008 | Krupinski |
| 2012/0136083 A1 | 5/2012 | Liebeno et al. |
| 2012/0197812 A1 | 8/2012 | Ishii et al. |
| 2014/0066530 A1 | 3/2014 | Shen et al. |
| 2014/0223673 A1 | 8/2014 | Wardlaw et al. |

* cited by examiner ns for Forming Footwear Using Recycled Plastics

CLAIM OF PRIORITY AND CROSS-REFERENCE TO RELATED APPLICATION

This application claims the benefit of and priority to U.S. Provisional Patent Application No. 62/678,472, which was filed on May 31, 2018, and is incorporated herein by reference in its entirety and for all purposes.

TECHNICAL FIELD

The present disclosure relates generally to methods for manufacturing articles of footwear. More specifically, aspects of this disclosure relate to manufacturing systems and processes for forming footwear sole structures using scrap or waste plastic materials.

BACKGROUND

Articles of footwear, such as shoes, boots, slippers, sandals, and the like, are generally composed of two primary elements: an upper for securing the footwear to a user's foot; and a sole for providing subjacent support to the foot. Uppers may be fabricated from a variety of materials, including textiles, foams, polymers, natural and synthetic leathers, etc., that are stitched or bonded together to form a shell or harness for securely receiving a foot. For sandals and slippers, the upper may have an open toe or open heel construction, or may be generally limited to a series of straps extending over the instep and, in some designs, around the user's ankle. Conversely, boot and shoe applications typically employ a full upper with a closed toe and heel construction that encases the foot. An ankle opening through a rear quarter portion of the upper provides access to the footwear's interior, facilitating entry and removal of the foot into and from the upper. A lace or strap may be utilized to secure the foot within the upper.

A sole structure is generally attached to the underside of the upper, positioned between the user's foot and the ground. In many articles of footwear, including athletic shoes and boots, the sole structure is a layered construction that generally incorporates a comfort-enhancing insole, an impact-mitigating midsole, and a surface-contacting outsole. The insole, which may be located partially or entirely within the upper, is a thin and compressible member that provides a contact surface for the underside "plantar" region of the user's foot. By comparison, the midsole is mounted underneath the insole, forming a middle layer of the sole structure. In addition to attenuating ground reaction forces, the midsole may help to control foot motion and impart enhanced stability. Secured to the underside of the midsole is an outsole that forms the ground-contacting portion of the footwear. The outsole is usually fashioned from a durable, wearproof material that includes tread patterns engineered to improve traction.

Some conventional methods of footwear manufacture use slabstock plastic to die-cut structural segments of the shoe, including midsoles, insole sock liners, and unitary sole constructions. Large extruding machines or heat presses are used to make the polymer slabs, which are then skived, cut, and shaped to the final parts prior to assembly into the individual shoes. Historically, a considerable amount of plastic scrap material is generated during the shoe manufacturing process. For example, scrap can be generated due to mold flashing, race-tracking, air entrapment, sink marking, burning or warpage, all of which may result in unacceptably damaged (C-grade) parts. In the footwear industry, waste plastic is also generated from outside sources, such as worn footwear that is discarded by the end user. Much effort has been expended to collect and recycle scrap materials produced during manufacture and waste materials from used products. In many instances, however, waste and scrap plastic cannot simply be blended with virgin starting materials because the recycled mass may be inconsistent from batch-to-batch, may be contaminated, or may have thermoset properties that prevent use in this fashion.

SUMMARY

Presented herein are manufacturing systems and processes for forming footwear using scrap or waste materials, methods for operating such systems, shoe structure segments fabricated from such materials, and articles of footwear assembled with such segments. By way of example, there is presented a manufacturing process workflow for fabricating a single-piece midsole/outsole of an athletic shoe using scrap and/or waste (collectively "recycled") plastics, such as thermoplastic elastomers (TPE) or ethylene-vinyl acetate (EVA) copolymers. In a compression molding application, a preform is fabricated e.g., via compression molding or injection molding, from recycled material mixed with a blowing/foaming agent that activates at high temperatures. The non-foamed preform is placed into a mold, which is then sealed, pressurized, and heated to activate the foaming agent. In so doing, the additive blowing/foaming agent foams and expands the polymer preform to fill the mold cavity. Comparatively, for an injection molding application, spent scrap and waste material is ground into granular form and mixed into a composition containing virgin polymer and foaming agent. The mixture of recycled, virgin, and foaming materials is injected, under pressure, into a mold that is smaller than (e.g., about half the size of) the finished sole structure. Due to increased temperatures within the mold, the foaming agent activates and expands the polymer mixture, which becomes entrained with high-pressure micro bubbles. The mold is then cooled and unsealed; when the mold is opened, these micro bubbles rapidly expand to enlarge the polymer mixture to a full-size sole structure, e.g., causing the sole to eject from the mold.

It is envisioned that an assortment of different techniques may be employed to fabricate a segment of an article of footwear using recycled EVA and/or TPE. For instance, the recycled polymer material compound may be ground into an injectable polymer (IP) formulation and processed per corresponding protocol prior to final formation. Processing may include the addition of foaming agents, fillers, pigments, processing aids, and/or crosslinking agents. Optionally, the recycled polymer compound may be ground into a compression molding polymer (CMP) preform material, processed per corresponding protocol, and molded into a desired preform configuration. Processing protocol may include batch mixing, cooling and dispersion, and calendaring or granulation to make a final mix compound ready for production. As an alternative to this concept, the ground recycled material is introduced directly into a preform mold, virgin CMP material (e.g., Phylon or synthetic rubber chips) is added to the preform mold, additional processing per corresponding protocol may be carried out, and the resultant mixture is molded into a desired preform configuration. As an extension of this concept, ground recycled material may be introduced directly into a final mold, a preform of virgin CMP material is then placed into the final mold, additional recycled material grind is scattered on the exposed surface of the virgin preform, corresponding processing is performed, and the final product is formed.

Other techniques for fabricating footwear using recycled EVA and/or rubber may include wetting a preform of virgin material, e.g., with soap and water, placing the wet preform in a container with ground recycled material, agitating the container to cover the preform with grind, placing the preform in a finishing mold, processing per usual protocol, and forming to final product. The foregoing process may be modified by using a preform fabricated with or entirely from the recycled EVA/TPE material. As another option, an IP preform of recycled polymer material compound may be fabricated as described above; the IP preform is then introduced into a compression molding cavity for final processing and formation. In the same vein, an IP preform of recycled polymer material may be created, fit into a mold scattered with recycled material grind, covered with recycled material grind, and subsequently processed and formed to a final product.

Continuing with the above discussion of representative manufacturing processes for fabricating footwear using recycled EVA and/or TPE, a composition of ground recycled material may be mixed into a polyurethane (PU) base material, such as poly-isocyanate polyol. The PU-grind mixture may be dosed into a mixing head with a dosing attachment (e.g., dosing pump and feeder nozzle with automated hydraulic non-return valve). Rather than dosing into the mixing head, ground recyclate may be dosed directly into the mold prior to introducing PU base material into the mold. For a rubber outsole compound option, recycled polymer material compound may be mixed into virgin rubber material or may be added as a "surface" option, i.e., sprinkled into the mold and onto the preform. Also similar to the options described above, the rubber may be ground and lightly coated onto the preform itself prior to placing the preform in the final mold.

Aspects of this disclosure are directed to manufacturing processes for fabricating footwear. In an example, a method is presented for manufacturing an article of footwear for a foot of a user. This representative method includes, in any order and in any combination with any of the above or below disclosed features and options: receiving a batch of recycled plastic material; grinding the batch of recycled plastic material; processing the ground recycled material, the processing including adding at least a foaming agent to the ground recycled material; placing the processed recycled material into an internal cavity of a final mold, which is shaped like a segment of the article of footwear; forming the footwear segment by heating the processed recycled material past a threshold activation temperature of the foaming agent such that the foaming agent causes the recycled material to expand and fill the internal cavity of the final mold; and, extracting the formed footwear segment from the mold.

Further aspects of the present disclosure are directed to footwear and/or segments of an article of footwear fabricated from any of the discloses processes and materials. For instance, an article of footwear, such as an athletic shoe, includes an upper that receives and attaches to the user's foot. A sole structure, which is attached to a lower portion of the upper, supports thereon the user's foot. This sole structure includes an outsole that defines the ground-engaging portion of the footwear. The sole structure is formed or machined with multiple distinctly shaped and sized cavities, multiple distinctly shaped and sized protrusions, and/or multiple distinctly shaped, sized, and colored plastic fragments, all of which are erratically dispersed on an outer surface of the sole structure. For at least some configurations, the entire outer surface of the sole structure is substantially covered with the erratically dispersed cavities, protrusions, and plastic fragments. Optionally, the sole structure is provided with 50 or more distinctly shaped cavities, 50 or more distinctly shaped protrusions, and 50 or more distinctly shaped/colored plastic fragments. This sole structure can be formed from any of the methods disclosed above and below. An attendant advantage to using a disclosed methodology in this manner is that no two sole structures will be identical.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
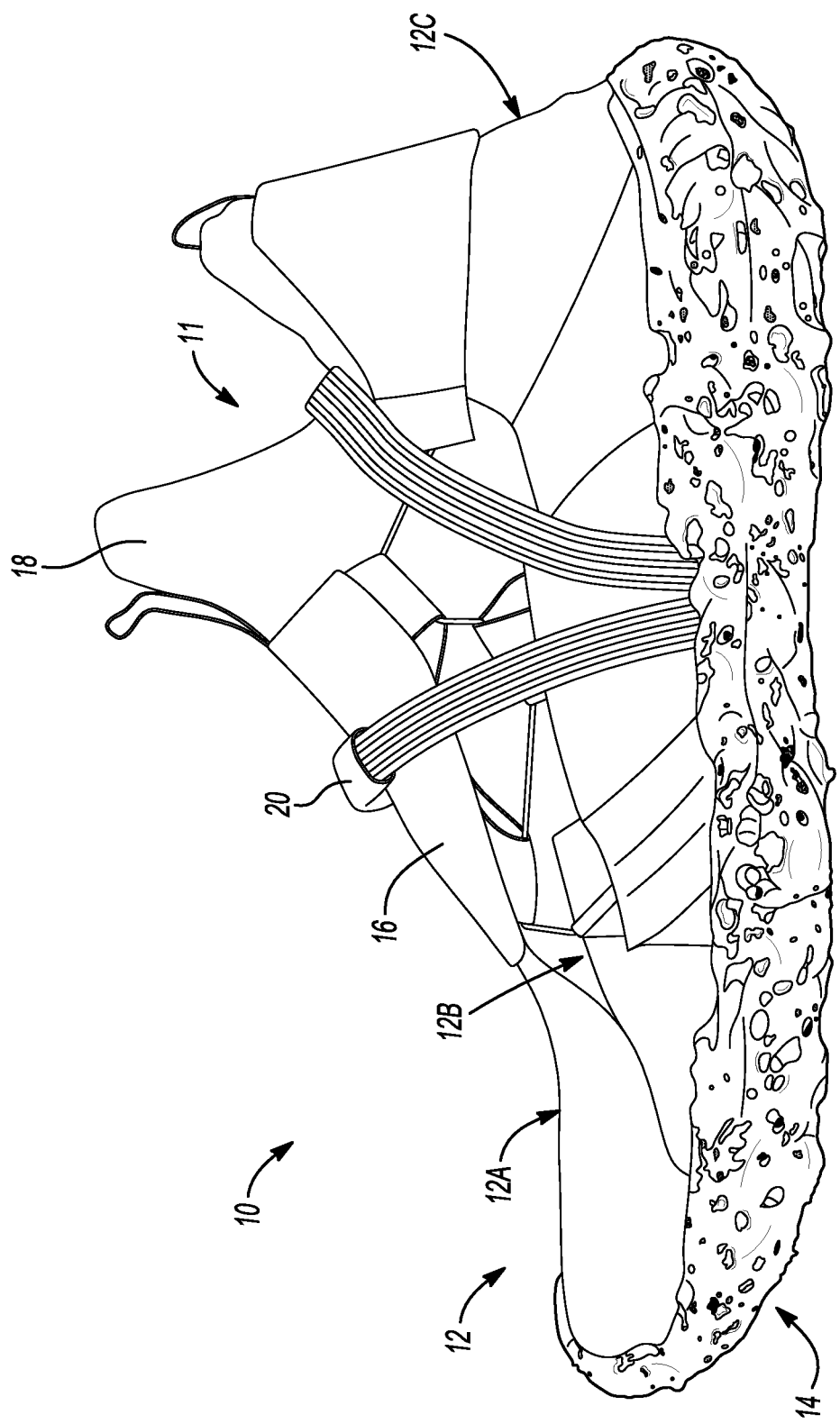
FIG. 1 is a lateral side-view illustration of a representative article of footwear with a unitary sole structure fabricated from recycled scrap or waste plastic material in accordance with aspects of the present disclosure.

The present disclosure is amenable to various modifications and alternative forms, and some representative embodiments have been shown by way of example in the drawings and will be described in detail herein. It should be understood, however, that the novel aspects of this disclosure are not limited to the particular forms illustrated in the above-enumerated drawing. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. There are shown in the drawings and will herein be described in detail representative embodiments of the disclosure with the understanding that these illustrated examples are provided as an exemplification of the disclosed principles, not limitations of the broad concepts of the disclosure. To that extent, elements and limitations that are described, for example, in the Abstract, Technical Field, Background, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including" and "comprising" and "having" shall each mean "including without limitation." Moreover, words of approximation, such as "about," "almost," "substantially," "generally," "approximately," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, medial, lateral, proximal, distal, vertical, horizontal, front, back, left, right, etc., may be with respect to an article of footwear when worn on a user's foot and operatively oriented with the base of the sole structure seated on a flat surface, for example.

Referring now to the drawings, wherein like reference numbers refer to like features throughout the several views, there is shown in FIG. 1 a representative article of footwear, which is designated generally at 10 and portrayed herein for purposes of discussion as an athletic shoe or "sneaker." The illustrated footwear 10—also referred to herein as "shoe" for brevity—is merely an exemplary application with which novel aspects and features of this disclosure may be practiced. In the same vein, implementation of the present concepts to manufacture a unitary sole structure of an athletic shoe should also be appreciated as a representative application of the concepts disclosed herein. It should therefore be understood that aspects and features of this disclosure may be implemented to manufacture other segments of a shoe, and may be implemented to construct any logically relevant type of footwear. As used herein, the terms "shoe" and "footwear," including permutations thereof, may be used interchangeably and synonymously to reference any relevant type of garment worn on a human foot. Lastly, the features presented in the drawings are not necessarily to scale and are provided purely for instructional purposes. Thus, the specific and relative dimensions shown in the drawings are not to be construed as limiting.

Figure 2:
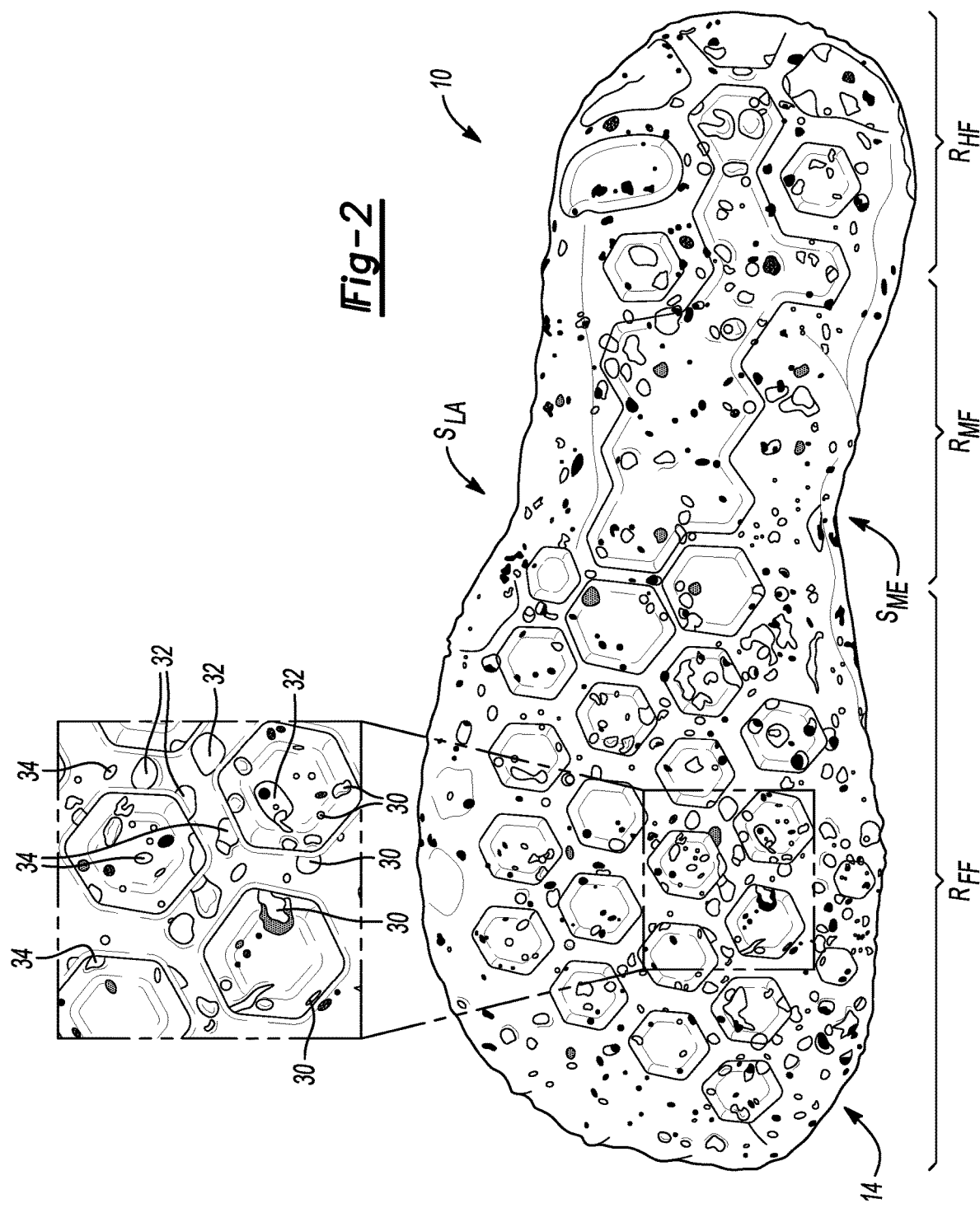
FIG. 2 is a bottom-view illustration of the representative unitary sole structure of FIG. 1.

The representative article of footwear 10 is generally depicted in FIGS. 1 and 2 as a bipartite construction that is primarily composed of a foot-receiving upper 12 mounted on top of a subjacent sole structure 14. For ease of reference, the footwear 10 may be divided into three anatomical regions: a forefoot region $R_{FF}$, a midfoot region $R_{MF}$, and a hindfoot (heel) region $R_{HF}$, as shown in FIG. 2. Footwear 10 may also be divided along a vertical plane into a lateral side $S_{LA}$—a distal half of the shoe 10 farthest from the sagittal plane of the human body—and a medial side $S_{ME}$—a proximal half of the shoe 10 closest to the sagittal plane of the human body—opposite the lateral side $S_{LA}$. In accordance with recognized anatomical classifications, the forefoot region $R_{FF}$ is located at the front of the footwear 10 and generally corresponds with the phalanges (toes), metatarsals, and any interconnecting joints thereof. Interposed between the forefoot and hindfoot regions $R_{FF}$ and $R_{HF}$ is the midfoot region $R_{MF}$, which generally corresponds with the cuneiform, navicular, and cuboid bones (i.e., the arch area of the foot). Hindfoot region $R_{HF}$, in contrast, is located at the rear of the footwear 10 and generally corresponds with the talus (ankle) and calcaneus (heel) bones. Both lateral and medial sides $S_{LA}$ and $S_{ME}$ of the footwear 10 extend through all three anatomical regions $R_{FF}$, $R_{MF}$, $R_{HF}$, and each corresponds with a respective transverse side of the footwear 10. While only a single shoe 10 for a left foot of a user is shown in FIGS. 1 and 2, a mirrored, substantially identical counterpart for a right foot of a user may be provided. Recognizably, the shape, size, material composition, and method of manufacture of the shoe 10 may be varied, singly or collectively, to accommodate practically any conventional and nonconventional application.

With continuing reference to FIG. 1, the upper 12 is depicted as having a shell-like closed toe and heel configuration for encasing a human foot. Upper 12 of FIG. 1 is generally defined by three adjoining sections, namely a toe box 12A, a vamp 12B, and a heel counter 12C. Toe box 12A is located in the forefoot region $R_{FF}$ to cover and protect the user's toes. Vamp 12B, by comparison, is located in the forefoot and midfoot regions $R_{FF}$ and $R_{MF}$, aft of the toe box 12A, to extend around and cover the user's instep. As shown, the vamp 12B also provides a tongue cover 16 and a shoe tongue 18. Heel counter 12C is aft of the vamp 12B and includes the rear and rear sides of the upper 12 to cover the foot from the ankle to the heel. While portrayed in the drawings as comprising three primary segments—the toe box 12A, vamp 12B, and heel counter 12C—the upper 12 may be fabricated as a single-piece construction or may be composed of any number of segments, including a toe cap, heel cap, ankle cuff, interior liner, etc. For sandal and slipper applications, the upper 12 may take on an open toe or open heel configuration, or may be replaced with a single strap or multiple interconnected straps.

The upper 12 portion of the footwear 10 may be fabricated from any one or combination of a variety of materials, such as textiles, engineered foams, polymers, natural and synthetic leathers, etc. Individual segments of the upper 12, once cut to shape and size, are stitched, adhesively bonded, welded, or otherwise joined together to form an interior void for comfortably receiving a foot. The individual material elements of the upper 12 may be selected and located with respect to the footwear 10 in order to impart properties of durability, air-permeability, wear-resistance, flexibility, and comfort, for example. An ankle opening 11 in the rear quarter of the upper 12 provides access to the interior of the assembled shoe 10. A shoe strap 20, lace, bungee, buckle, or other conventional mechanism may be utilized to modify the girth of the upper 12 to more securely retain the foot within the interior of the shoe 10 as well as to facilitate entry and removal of the foot into/from the upper 12. Strap 20 may be threaded through a series of eyelets in the upper 12; a tongue 18 may extend between the strap 20 and the interior void of the upper 12.

Sole structure 14 is rigidly secured to the upper 12 such that the sole structure 14 extends between the upper 12 and a support surface upon which a user stands, for example. In effect, the sole structure 14 functions as an intermediate support platform that separates the user's foot from the ground. In addition to attenuating ground reaction forces and providing cushioning for the foot, sole structure 14 of FIGS. 1-3 may provide traction, impart stability, and help to limit various foot motions, such as inadvertent foot inversion and eversion. In accordance with the illustrated example, the sole structure 14 is fabricated as a single-piece, unitary structure with integrally formed insole, midsole, and outsole sections. Alternative sole configurations may be fabricated as a sandwich structure with a top-most insole, a bottom-most outsole, and an intermediate midsole sandwiched between and adjoining the insole and outsole. Sole structure 14 may incorporate one or more materials or embedded elements that enhance the comfort, performance, and/or ground-reaction-force attenuation properties of footwear 10.

These elements and materials may include, individually or in any combination, a polymer foam material, such as polyurethane or ethylene-vinyl acetate, filler materials, moderators, air-filled bladders, plates, lasting elements, or motion control members. Sole structure 14 may incorporate a rubber material that provides a durable and wear-resistant surface for engaging the ground. In addition, sole structure 14 may also be textured to enhance the traction (i.e., friction) properties between footwear 10 and the underlying support surface.

Figure 3:
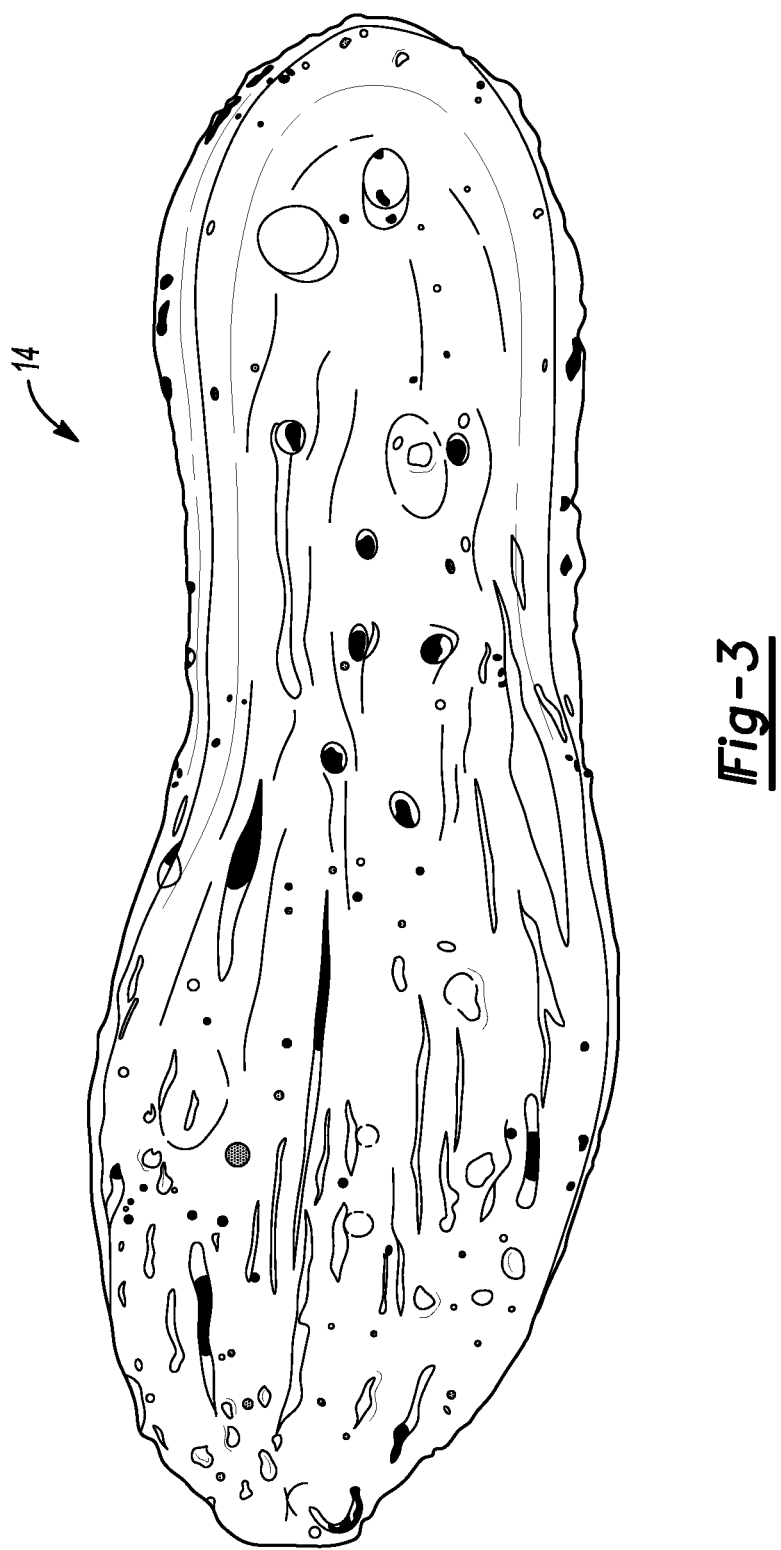
FIG. 3 is a plan-view illustration of the representative unitary sole structure of FIG. 1.

With collective reference to FIGS. 1-3, the sole structure 14 may be fabricated with an atypical and, in some applications, one of a kind surface topology that may be typified by a distinct pattern of craters and bumps that is further differentiated by a unique color scheme. For instance, the outer surface of the illustrated sole structure 14 is fabricated using a manufacturing process 100 (described below with respect to FIG. 4) that is engineered to generate a randomly interspersed mixture of distinctly shaped and sized cavities, a representative sample of which is designated at 30 in the inset view of FIG. 2. Footwear 10 of FIG. 2 is also fabricated with a randomly interspersed mixture of distinctly shaped and sized protrusions, a representative sample of which is designated at 32, that project in multiple directions from the outer peripheral surface and ground-engaging surface of the sole structure 14. As a further option, an assortment of distinctly shaped, sized, and colored plastic fragments, a representative sample of which are designated at 34 in the inset view of FIG. 2, may be erratically dispersed across and embedded in the outer surface of the sole structure 14. Generally speaking, the surface topology of the sole structure 14 may be characterized by a lack of two structurally identical, equisized sections of surface area as viewed by the naked eye. Cratering and bulging of the sole structure 14 surface may result from recycled polymers "sweating" entrained oils during the foaming and forming operations described below.

Continuing with the above discussion, the outer surface of the sole structure 14 is shown covered in its entirety with the erratically dispersed cavities 30, protrusions 32, and colored fragments 34. Alternative shoe configurations may be formed or machined with specific segments of the sole structure 14 that lack the cavities 30, the protrusions 32, and/or the colored fragments 34. Producing the sole structure 14 using the manufacturing process 100 described below may result in any number of craters, bumps, and colors; the sole structure 14 of FIG. 2, for example, includes fifty (50) or more distinctly shaped cavities 30, fifty (50) or more distinctly shaped protrusions 32, and fifty (50) or more distinctly shaped and colored plastic fragments 34. While not per se required, the number of cavities 30, number of protrusions 32 and number of colored fragments 34 may be distinct from one another. It is further envisioned that these cavities 30, protrusions 32, and colored fragments 34 may take on an indeterminate combination of shapes, including regular and irregular geometric forms, and sizes, as restricted by the total surface area of the sole structure 14.

Figure 4:
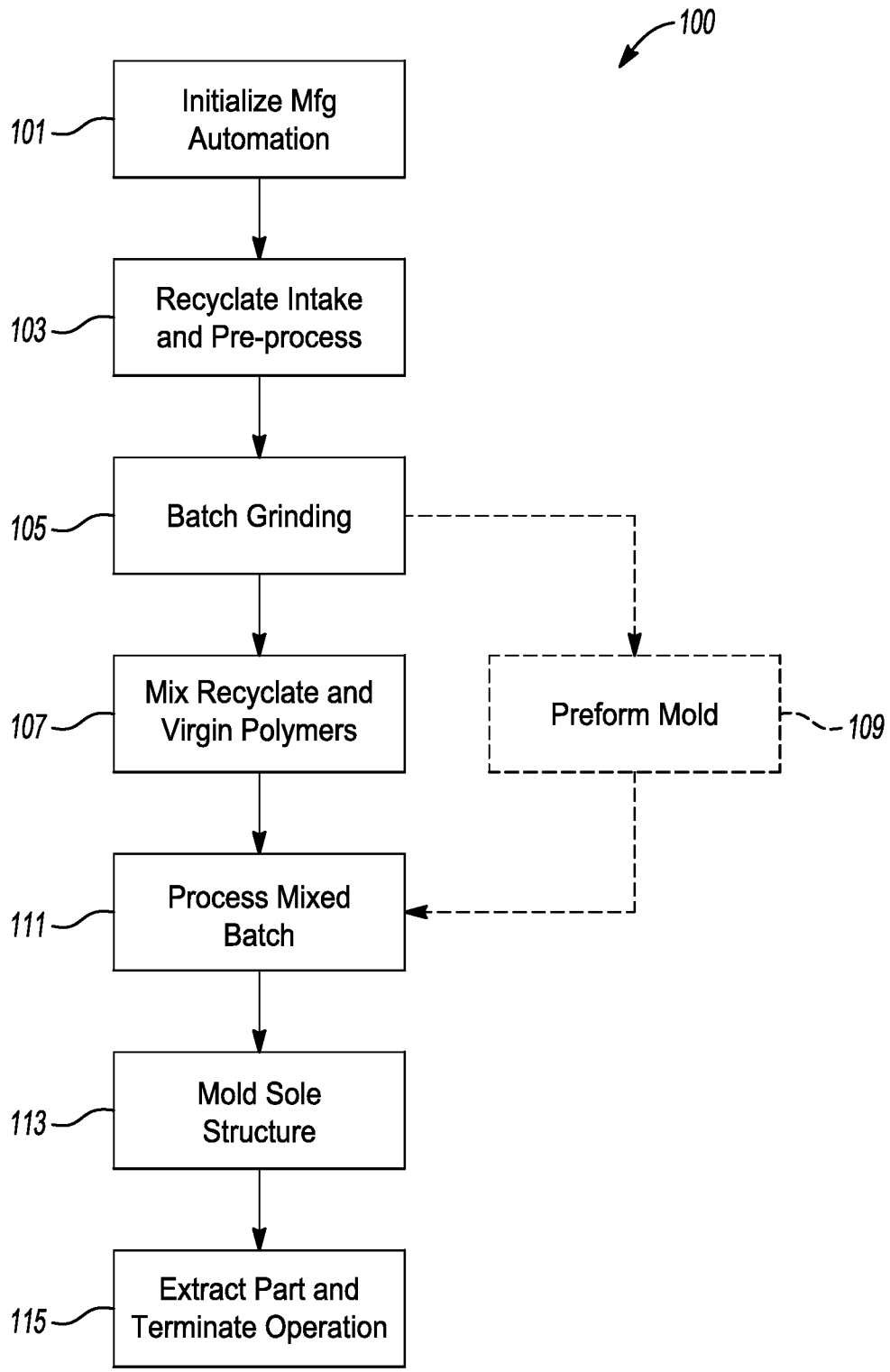
FIG. 4 is a flowchart illustrating a representative workflow process for manufacturing a segment of an article of footwear, which may correspond to memory-stored instructions executed by a manufacturing system controller, control-logic circuitry, programmable electronic control unit, or other integrated circuit (IC) device or a network of IC devices in accord with aspects of the disclosed concepts.

A variety of techniques, elective processes, and system architectures may be utilized to manufacture the athletic shoe 10 of FIGS. 1-3. By way of non-limiting example, FIG. 4 presents an improved footwear manufacturing method, designated generally at 100, for forming a footwear sole structure, such as sole structure 14, in accordance with aspects of the present disclosure. Some or all of the operations illustrated in FIG. 4 and described in further detail below may be representative of an algorithm that corresponds to processor-executable instructions that may be stored, for example, in main or auxiliary or remote memory, and executed, for example, by a local or remote controller, processing unit, control logic circuit, or other module or device, to perform any or all of the above or below described functions associated with the disclosed concepts. One or more of the illustrated operations may be carried out or assisted manually by an onsite technician. It should be recognized that the order of execution of the illustrated operation blocks may be changed, additional blocks may be added, and some of the blocks described may be modified, combined, or eliminated.

Method 100 of FIG. 4 is initialized at terminal block 101, e.g., responsive to receipt of an activation command signal received from a human machine interface (HMI) of a central control terminal. Initial stages of the manufacturing process may comprise supplying, accessing, and/or utilizing (collectively "providing") the various materials, tools and machines needed to manufacture the athletic shoe 10. At process block 103, for example, a batch of recycled plastic material is accessed from an available store of polymer recyclate. As used herein, the term "recycled plastic" may encompass used or excess or scrapped plastic that is put into a recycling stream, including wholesale recycling of entire products, disassembly of products and recycling only selected parts, recycling of manufacturing byproduct, all of which may require sorting and cleaning of collected materials. For at least some embodiments, scrap and waste polyolefin foams are recovered and incorporated into foamed articles produced with at least some virgin polyolefin materials. It may be desirable, depending on an intended application, that at least 40 parts of recycled EVA foam per 100 parts virgin EVA be incorporated into newly foamed EVA articles by the methods described herein. The batch of recycled plastic material may include thermoplastic elastomer (TPE) plastics, such as a synthetic rubber, or ethylene-vinyl acetate (EVA) copolymer plastics, such as Phylon. Phylon is conventionally made of EVA pellets that are compressed, heat expanded, and then cooled in a mold.

Once the batch of recycled plastic is received and any attendant sorting, cleaning or other pre-processing is complete at process block 103, the method 100 shreds, chops, cuts or otherwise grinds the batch of recycled plastic at process block 105. A dedicated recycling station may be responsible for grinding recycled Phylon or rubber into pelletized form; ground recycled material may be produced in real-time or stored in inventory and reused when desired. Alternatively, "grinding" may comprise feeding a hot compound of recyclate into an extruder fitted with a perforated die; a cutter immediately in front of the die slices extruded strings of compound into granulized pellets. Cut pellets are then cooled as they are transported to a sieve grader to separate out irregularly sized pellets. Unlike some conventional techniques for recycling polyolefin polymers, the method 100 may grind and reuse excess Phylon that was previously heated above the threshold temperature at which the foaming agent is activated. In addition, the method 100 may minimize or otherwise eliminate the use of hydrocarbon resin compatibilzers to modify the physical properties of the recycled and virgin materials during production of the molded articles.

At process block 107, the ground recycled material is mixed with a composition of virgin polymer material. A recycled material may be contrasted with a virgin material in that a raw material has neither been expanded through activation of an intermixed foaming agent nor been formed into an end product. The virgin polymer may be the same general polymer composition as or may be a distinguishable polymer composition from the recyclate. For instance, a batch of recycled EVA may be mixed with virgin EVA or virgin synthetic rubber. The virgin resin may comprise EVA copolymer having 15-60 mole percent vinyl acetate. As another option, at this stage of the manufacturing workflow process 100, ground recycled material may also be mixed with a polyurethane (PU) base material. Pelletized virgin polymer may be stowed as inventory in a storage bay, and retrieved from inventory, e.g., utilizing a first-in-first-out (FIFO) scheme according to the known shelf-life of the inventoried polymer.

For some applications, the virgin and recycled materials are not pre-mixed prior to forming. Rather, one or more of the individual constituent parts of the recycled and virgin polymer composition may be shaped into a preform prior to placing the polymer composition into a final mold for forming a desired segment of an article of footwear, as indicated at optional process block 109. In an example, the ground recyclate may be melted, extruded, skived, cut and then die cut to a desired length. These die-cut planks may each be shaped in a preform mold to an intermediate preform size and shape. Preforming the recycled EVA/TPE material may be achieved via compression molding, injection molding, or any other suitable molding technique using a preform mold. For some optional applications, a metered amount of virgin polymer material may be added into the preform mold during fabrication of the recyclate preform. It is also envisioned that the virgin polymer material be processed as described above into a virgin polymer preform. The final mold may comprise a discrete complementary recess for each of the foregoing preforms. A release agent may be applied to an exposed surface of each preform and/or an exposed surface of each complementary recess to facilitate separation of the final product from the mold assembly after its formation.

With continuing reference to FIG. 4, method 100 continues to process block 111 with instructions to treat the mixture of recycled material, e.g., with the addition of blowing/foaming agents, fillers, pigments, processing aids, and/or crosslinking agents. In at least some implementations, a foaming agent is incorporated as a separate ingredient into the mixture of recycled and virgin polymer material for invoking the expansion of the mixture during molding. This foaming agent may be thermally decomposable, and may be selected from organic and inorganic chemical foaming agents. The foaming agent may comprise any substance which, alone or in combination with other substances, is capable of producing a cellular structure in a plastic. Foaming agents may include compressed gases that expand when pressure is released, soluble solids that leave pores when leached out, liquids that develop cells when they change to gases, and chemical agents that decompose or react under the influence of heat to form a gas. By way of example, the chemical foaming agent may range from a simple salt, such as ammonium or sodium bicarbonate, to a complex nitrogen releasing agent. For at least some applications, the foaming agent includes azohexahydrobenzonitrile, diazocarbamide, azodicarbonamide, diazodiaminobenzene, benzenesulfonylhydrazide, terephthalazide, sulfonylhydrazide compounds, sodium bicarbonate, ammonium bicarbonate, or any combination thereof. In operation, once the forming apparatus arrives at the activation temperature of the foaming agent, a polymer chain of the EVA mixture begins to break down causing the EVA to attain elastomeric properties. The decomposition temperature of the foaming agent may be from about 120° C. to about 200° C.

Numerous other additives may be incorporated into the recyclate batch prior to introduction into the final mold for forming the footwear sole structure. As an example, a chemical foaming auxiliary agent may be added to lower the decomposition temperature of the foaming agent. Conversely, a chemical foaming inhibitor may be added in measure to raise the decomposition temperature of the thermally decomposable foaming agent. Another option may include adding a metered amount of a chemical crosslinking agent to link the polymer chain of the recyclate material to the polymer chain of the virgin material. Under the temperature conditions of the reaction, a peroxide-based agent may be activated to initiate the process of crosslinking by removing a hydrogen atom from a polymer backbone to thereby provide sites for crosslinking. The nature and level of the crosslinking agent may be selected to provide suitable foaming and crosslinking in conjunction with the foaming agent.

Other components can be added to the polymer compositions, including fillers, activators, homogenizing agents, pigments, fire retardants, lubricants, and other suitable additives. Non-limiting examples of filler materials include talcum powder, mica silicate, bearing sulfate, magnesium hydroxide, magnesium carbonate, magnesium silicate, calcium carbonate, and other commercially available fillers. The polymer compositions can also contain rubber fillers, such as ethylene propylene rubber (EPR), styrene isoprene styrene (SIS) copolymer rubber, styrene butadiene rubber, as well as other polyolefin resins, in addition to EVA or TPE base materials. In other examples, polyethylene wax may be used as a processing agent, stearic acid may be used as a lubricant, dicumyl peroxide may be used as a polymerization initiator, zinc oxide may be used as an activator for the foaming agent, while titanium dioxide may be used as a white pigment.

Once the polymer composition is complete and ready for molding, the processed recycled material is placed into the internal cavity of a final mold that is shaped like a segment of an article of footwear, as indicated at process block 113. This footwear segment may be formed via compression molding, injection molding, two-shot molding, insert molding, co-injection molding or any other technique for forming the desired footwear segment. In a representative example, the recycled EVA and/or TPE materials are batch mixed, e.g., in a kneader or continuous mixing extruder (process block 107), treated and processed (process block 111), cooled and dispersed on an open mill, and calendared or granulated to produce a final mix compound ready for production foam. Large steam heat presses may be used to make slabs of polymer foam; the slab stock foam is then skived and cut into preforms, then finally molded (process block 113) into unitary sole structures, midsoles, outsoles, insoles or sock liners, or other desired segment or segments of a shoe. For a Phylon application, raw material compound may be pressed into sheet form, which is then foamed and post-processed, e.g., to remove an unwanted skin, thereafter die cut into preforms, and the individual preforms pressed in the final mold. For injection molded Phylon, the recyclate and virgin material compound may be injected directly into the final mold. Conversely, for compression molded Phylon, the polymer material compound may be blown into a semi-finalized shape, which is then buffed and finished into the final state.

For applications in which the virgin polymer composition is first shaped into a preform, a metered portion of the processed recycled material may first be scattered around the internal cavity of the final mold. The virgin polymer preform is then placed into the internal cavity and, after proper placement of the preform, another metered portion of the recycled material is scattered on an exposed surface of the virgin polymer preform. It is also envisioned that only select segments of the preform be covered with the recycled material. As an additional or alternative option, the virgin polymer preform may be fashioned with a predetermined amount of the recycled polymer material. Another option may include wetting the virgin polymer preform prior to placement in the final mold. The wet preform is then placed inside a sealable container. This container may be partially pre-filled with polymer recyclate; once the wet preform is inside the container, processed recycled material may be dosed into the container. The container is shaken, vibrated or otherwise agitated to coat the preform with recycled material. After being coated with recyclate, the virgin polymer preform may be placed inside the internal cavity of the final mold. The formed footwear segment is extracted from the final mold at process block 115; at this juncture, the method 100 may terminate or may loop back to terminal block 101 and run in a repeatable or continuous loop.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method for manufacturing an article of footwear, the method comprising:
    receiving recycled plastic material;
    grinding the recycled plastic material into ground recycled material;
    processing the ground recycled material into processed recycled material, the processing including adding a resin and a foaming agent to the ground recycled material;
    placing the processed recycled material into an internal cavity of a final mold, the internal cavity shaped like a footwear segment of the article of footwear, wherein placing the processed recycled material into the internal cavity includes:
    forming a preform of the processed recycled material,
    scattering a first portion of the ground recycled material around the internal cavity of the final mold, and
    placing the preform into the internal cavity of the final mold;
    forming the footwear segment including heating the processed recycled material past a threshold activation temperature of the foaming agent such that the foaming agent causes the processed recycled material to expand and fill the internal cavity of the final mold; and
    extracting the formed footwear segment from the final mold.

2. The method of claim 1, wherein the received recycled plastic material includes scrap and/or waste material comprising thermoplastic elastomer (TPE) plastic and/or ethylene-vinyl acetate (EVA) copolymer plastic.

3. The method of claim 1, wherein the received recycled plastic material comprises a butadiene rubber.

4. The method of claim 1, wherein forming the footwear segment further includes compression molding or injection molding the processed recycled material in the final mold.

5. The method of claim 1, further comprising;
    preforming virgin polymer material into a virgin plastic preform; and
    prior to forming the footwear segment, placing the virgin plastic preform into the internal cavity of the final mold.

6. The method of claim 1, wherein forming the processed recycled material into the preform includes compression molding or injection molding the processed recycled material in a preform mold.

7. The method of claim 6, wherein forming the processed recycled material into the preform further includes adding a composition of virgin polymer material into the preform mold.

8. The method of claim 1, wherein processing the ground recycled material further includes adding to the ground recycled material a filler, a pigment, a processing aid, and/or a crosslinking agent.

9. The method of claim 1, further comprising placing a preform of virgin polymer material into the internal cavity of the final mold prior to forming the footwear segment.

10. The method of claim 1, further comprising, after placing the preform into the internal cavity, scattering a second portion of the ground recycled material on an exposed surface of the preform.

11. The method of claim 1, wherein the resin includes a polyurethane (PU) base material.

12. The method of claim 1, wherein the resin includes a virgin synthetic rubber material.

13. The method of claim 1, wherein the foaming agent includes a diazocarbamide.

14. A method for manufacturing an article of footwear, the method comprising:
receiving recycled plastic material;
grinding the recycled plastic material into ground recycled material;
processing the ground recycled material into processed recycled material, the processing including adding a resin and a foaming agent to the ground recycled material;
placing the processed recycled material into an internal cavity of a final mold, including:
forming a preform of the processed recycled material;
wetting the preform;
placing the wet preform into a container;
placing an amount of ground recycled material into the container;
agitating the container to coat the preform with the ground recycled material; and
placing the preform coated with the ground recycled material into the internal cavity of the final mold;
forming a footwear segment including heating the processed recycled material past a threshold activation temperature of the foaming agent such that the foaming agent causes the processed recycled material to expand and fill the internal cavity of the final mold; and
extracting the formed footwear segment from the final mold.

15. The method of claim 14, further comprising, prior to placing the preform into the internal cavity, scattering a predefined portion of the ground recycled material around the internal cavity of the final mold.

16. The method of claim 14, wherein the received recycled plastic material includes scrap and/or waste material comprising thermoplastic elastomer (TPE) plastic and/or ethylene-vinyl acetate (EVA) copolymer plastic.

17. The method of claim 14, wherein the received recycled plastic material includes a butadiene rubber.

18. The method of claim 14, wherein forming the footwear segment further includes compression molding or injection molding the processed recycled material in the final mold.

19. The method of claim 14, wherein forming the processed recycled material into the preform includes compression molding or injection molding the recycled material in a preform mold.

20. The method of claim 19, wherein forming the processed recycled material into the preform further includes adding a composition of virgin polymer material into the preform mold.

21. The method of claim 14, wherein processing the ground recycled material further includes adding to the ground recycled material a filler, a pigment, a processing aid, and/or a crosslinking agent.

22. The method of claim 14, further comprising placing a preform of virgin polymer material into the internal cavity of the final mold prior to forming the footwear segment.

23. The method of claim 14, wherein the resin includes a polyurethane (PU) base material.

24. The method of claim 14, wherein the resin includes a virgin synthetic rubber material.

25. The method of claim 14, wherein the foaming agent includes a diazocarbamide.

* * * * *